(12) United States Patent
Gerbl et al.

(10) Patent No.: US 9,957,833 B2
(45) Date of Patent: May 1, 2018

(54) TURBOMACHINE STAGE AND METHOD FOR DETERMINING A SEAL GAP AND/OR AN AXIAL POSITION OF SUCH A TURBOMACHINE STAGE

(71) Applicant: MTU Aero Engines AG, Munich (DE)

(72) Inventors: Florian Gerbl, Olching (DE); Juergen Gruendmayer, Starnberg (DE); Martin Stadlbauer, Munich (DE); Ernst Trassl, Munich (DE)

(73) Assignee: MTU Aero Engines AG, Munich (DE)

( * ) Notice: Subject to any disclaimer, the term of this patent is extended or adjusted under 35 U.S.C. 154(b) by 740 days.

(21) Appl. No.: 14/284,116

(22) Filed: May 21, 2014

(65) Prior Publication Data

US 2014/0348631 A1    Nov. 27, 2014

(30) Foreign Application Priority Data

May 22, 2013    (EP) ..................................... 13168659

(51) Int. Cl.
| | |
|---|---|
| *F01D 21/00* | (2006.01) |
| *F01D 11/14* | (2006.01) |
| *F01D 17/02* | (2006.01) |
| *G01B 7/14* | (2006.01) |

(52) U.S. Cl.
CPC ............ *F01D 21/003* (2013.01); *F01D 11/14* (2013.01); *F01D 17/02* (2013.01); *G01B 7/14* (2013.01); *F05D 2270/821* (2013.01)

(58) Field of Classification Search
CPC ........ F01D 11/14; F01D 17/02; F01D 21/003; F05D 2270/821; G01B 7/14; G01B 7/144

USPC .................. 415/118, 134; 324/662; 702/158
See application file for complete search history.

(56) References Cited

U.S. PATENT DOCUMENTS

| | | | | |
|---|---|---|---|---|
| 4,573,867 | A | * | 3/1986 | Hand ...................... F01D 25/26 415/134 |
| 7,333,913 | B2 | * | 2/2008 | Andarawis ............. G01B 7/144 702/158 |
| 2006/0132147 | A1 | * | 6/2006 | Balasubramaniam ... G01B 7/14 324/662 |

(Continued)

FOREIGN PATENT DOCUMENTS

| | | |
|---|---|---|
| GB | 2 204 693 A | 11/1988 |
| WO | WO 2008/031394 A2 | 3/2008 |

OTHER PUBLICATIONS

European Search Report dated Oct. 17, 2013, with Statement of Relevancy (Five (5) pages).

(Continued)

*Primary Examiner* — Mark Laurenzi
*Assistant Examiner* — Paul Thiede
(74) *Attorney, Agent, or Firm* — Crowell & Moring LLP

(57) ABSTRACT

A turbomachine stage, particularly a turbine stage or a compressor stage of a gas turbine, is disclosed. The turbomachine stage has a, conical in particular, housing in which is arranged a moving vane arrangement with multiple moving vanes which have an exterior shroud band with at least one radial sealing flange. The sealing flange has a recess arrangement with at least one radial recess in which, centrally in particular, a radial projection is arranged. There is arranged on the housing a sensor arrangement with at least one capacitive sensor for detecting a radial clearance to a peripheral surface of the sealing flange.

10 Claims, 2 Drawing Sheets

(56) References Cited

U.S. PATENT DOCUMENTS

2009/0003991 A1   1/2009  Andarawis et al.
2014/0348632 A1* 11/2014  Zielinski ............... F01D 11/08
                                                           415/1

OTHER PUBLICATIONS

U.S. Patent Application, "Turbomachine Stage and Method for Detecting a Sealing Gap of Such a Turbomachine Stage", filed May 21, 2014, Inventor Michael Zielinski, et al.

* cited by examiner

TURBOMACHINE STAGE AND METHOD FOR DETERMINING A SEAL GAP AND/OR AN AXIAL POSITION OF SUCH A TURBOMACHINE STAGE

This application claims the priority of European Patent Application No. EP 13168659.4, filed May 22, 2013, the disclosure of which is expressly incorporated by reference herein.

BACKGROUND AND SUMMARY OF THE INVENTION

The present invention relates to a turbomachine stage, particularly a turbine or compressor stage of a gas turbine, with a housing, particularly a conical one, in which a moving vane arrangement with multiple moving vanes is arranged, which have an exterior shroud band with at least a radial sealing flange, as well as a method for determining a seal gap and/or an axial position of the moving vane arrangement of such a turbine machine stage.

By one or more radial sealing flanges arranged one after the other in an axial direction, the seal gap between a housing and an exterior shroud band can be reduced. In doing so, there may result, due to various operating conditions, light contact between the sealing flange and the housing, and consequently to abrasion on the sealing flange and/or a rubbing in the housing, so that the seal gap changes. Knowledge of the current seal gap can be advantageous, particularly to adapt the operation of the turbomachine to it and/or to perform or plan maintenance. Additionally or alternatively, knowledge of the current axial position of the moving vane arrangement can be advantageous, particularly to adapt the operation of the turbomachine to it.

An object of an embodiment of the present invention is to improve the maintenance and/or the operation of a turbomachine stage.

A turbomachine stage according to an aspect of the present invention may be in particular a turbine or compressor stage of a gas turbine, preferably of an aircraft engine.

It has a moving vane arrangement with multiple adjacent moving vanes in the peripheral direction, which can be constructed with a rotor of a turbomachine in a detachable or rigid manner, particularly in an integral manner. The moving vane arrangement is arranged in a housing, which in an embodiment—at least in the region of the moving vane arrangement—can converge or diverge in the flow direction, which is designated here for the purposes of a more concise overview in general as a conical housing. Similarly, the housing—at least in the region of the moving vane arrangement—may have in the flow direction an at least essentially constant cross-section, which is in this case correspondingly described as a cylindrical housing.

The moving vane arrangement has an exterior shroud band that may be formed by multiple exterior shroud band sections, to which one or more moving vanes may each be connected. In an embodiment, the exterior shroud band may converge or diverge in the flow direction or have an at least essentially constant exterior circumference, which in this case is correspondingly referred to as a conical or cylindrical exterior shroud band.

Radially outside on the exterior shroud band, there are arranged one or more radial sealing flanges spaced apart from each other in an axial or flow direction, which extend preferably radially outward in a strut-like manner as well as in the peripheral direction. Such radial sealing flanges are hereinafter referred to as sealing fin(s) for short.

According to an aspect of the present invention, the sole sealing flange-if there are multiple axially spaced-apart sealing flanges, then one or more-particularly all sealing flanges, each have a recess arrangement with one or more radial recesses. Several radial recesses may be distributed equidistantly or asymmetrically over the circumference. In an embodiment, the recess arrangement has exactly two, three, or four recesses. A recess may have in an embodiment two opposing flanks, which in a development, extend at least essentially in a radial direction and/or transition in an adjoining, preferably cylindrical ring-shaped exterior surface of the sealing flange, preferably in a curved structure. Between the flanks, there extends in a development a recess bottom, which in one embodiment may have at least essentially a cylindrical ring-shaped peripheral surface. Thus in an embodiment, a recess may be constructed particularly in a U-shaped manner.

In the recess, there is arranged a radial projection. In particular, it can extend radially outward from the recess bottom and in a development it can have at least essentially a cylindrical ring-shaped peripheral surface. When seen in a peripheral direction, the radial projection can be arranged in the recess, particularly in a centered manner, but similarly also in an off-centered manner. In an embodiment, the recess with the projection arranged in it is constructed symmetrically, which can advantageously generate identical signals in counter-directional rotations. Similarly, the recess with the projection arranged in it can also be constructed asymmetrically to advantageously generate different signals in counter-directional rotations.

On the housing, there is arranged a sensor arrangement with one or more capacitive sensors or probes for detecting a radial clearance to a peripheral surface of the sealing flange. Multiple sensors may be distributed equidistantly or asymmetrically across the circumference. In an embodiment, the sensor arrangement has exactly two, four or six sensors. In this case, a capacitive sensor for detecting a radial clearance to a peripheral surface of the sealing flange refers particularly to a means that delivers a signal, which depends on a radial distance of the sensor to the peripheral surface, preferably in a non-linear manner. In this case, a peripheral surface describes in particular a surface of a sealing flange, a recess, or a projection, which extends in the peripheral and axial direction, in other words the top side of the sealing flange, the recess, or the projection when seen from the outside.

When a sensor is passed over by a recess, the radial distance changes: first it increases as soon as the sensor detects the recess bottom. Then, the radial distance decreases when the sensor detects the projection. Then, it increases again as soon as the sensor detects the recess bottom on the opposite side of the projection going in the peripheral direction. Lastly, the radial distance decreases again to the initial value when the sensor detects the peripheral surface of the sealing flange next to the recess. Thus in an embodiment, when a recess rotates past a sensor, a general W-type signal trend results with four alternating, counter-directional signal swings. A signal swing refers in this case particularly to an increase or decrease, in particular an essentially plateau- or shoulder-shaped one, of the signal or the signal value of the sensor.

According to one aspect of the present invention, at least one signal swing of the sensor arrangement is detected as a result of at least one recess of the recess arrangement being detected by at least one sensor of the sensor arrangement. The subsequent detection or evaluation illustrated hereinafter by means of a recess and one or two sensors can be performed in an identical manner for multiple recesses and/or sensors, wherein then, in an embodiment, the detection results can be compared against each other, and in particular can be averaged.

A signal swing according to the invention can result, particularly when seen in the rotation direction, during a transition from a peripheral surface of the sealing flange next to a recess of the recess arrangement to this recess or (in the opposite direction thereto) from a recess of the recess arrangement to a peripheral surface of the sealing flange next to this recess. Both are equally referred to as signal swing as a result of detecting a recess by a sensor according to the present invention. Similarly, a signal swing according to the invention can also result when transitioning from a recess bottom of a recess of a recess arrangement to the projection of this recess or (in the opposite direction thereto) from a projection of a recess of the recess arrangement to a recess bottom of this recess next to this projection. This is also referred to as a signal swing as a result of detecting a recess by a sensor according to the present invention. In addition, such a signal swing can, or is, also be referred to as a signal swing as a result of detecting a recess and the projection in this recess by a sensor.

In an embodiment, the signal swing that results due to a change in distance between the recess bottom and the projection and/or between the projection and the recess bottom, i.e., a signal swing due to detecting a recess and the projection in this recess, is assigned to a radial distance of the moving vane arrangement on the basis of a prior calibration: for a capacitive sensor, the direct or indirectly detected capacity of a condenser changes as a result of the change of the effective peripheral surface of the recess bottom or projection. This change or this signal swing is different for different radial distances of the sealing flange to the sensor or the housing on which it is arranged. Accordingly, the signal swing can be assigned to a certain radial distance, wherein, in a prior calibration, certain signal swings were assigned according to certain radial distances. The assignment of a detected signal swing to a radial distance on the basis of a prior calibration can result in particular by means of a, preferably linear, interpolation or extrapolation between value pairs of the calibration.

In an embodiment, the sensor arrangement has at least two sensors, whose sensing surfaces form various, particularly counter-directional, preferably at least essentially equal angles to a rotational axis of the turbomachine stage. The angles are advantageously greater than 5° in size, particularly greater than 10°. Additionally or alternatively, in an embodiment, they are smaller than 75° in size, particularly smaller than 25°. In an embodiment, the angles are at least essentially equal ±15°, in another embodiment, at least essentially ±60°.

A sensor has in the peripheral direction a sensing region. The sensing regions lying one behind the other in an axial direction together form a sensing surface according to the present invention. A sensor has in particular a sensing surface that forms an angle to the rotational axis, where the sensor detects recesses or projections displaced in an axial direction before and after. The greater the size of the angle, the earlier or later the sensor detects two recesses or projections shifted in an axial direction or aligning with each other. If for example a sensor has a rectangular sensor surface facing the sealing flange, whose primary axis forms an angle to the rotational axis of the turbomachine stage, then the sensing surface also correspondingly forms this angle to the rotational axis.

By means of these sensing surfaces inclined against the rotational axis of the turbomachine, one can, according to an embodiment, detect an axial position of the moving vane arrangement. To this end in an embodiment, initially a signal swing of the sensor arrangement is detected as a result of a recess of the recess arrangement and/or the projection in this recess being detected by a sensor of the sensor arrangement. By the continued rotation of the rotor toward another sensor, another signal swing of the sensor arrangement is subsequently detected as a result of this recess and/or the projection in this recess being detected by another sensor of the sensor arrangement. The interval of these signal swings, particularly the time or rotational angle interval, can then be assigned, on the basis of a prior calibration, to an axial position of the moving vane arrangement. If the sensing surfaces of two sensors converge in an axial direction, the interval of the signal swings decreases as the sealing flange is displaced further in an axial direction. Reciprocally, the interval increases for sensing surfaces that are diverging in an axial direction or for a shift that is opposite the axial direction.

As explained precedingly, the intervals of signal swings of both sensors can be detected as a result of a transition from a peripheral surface of the sealing flange next to a recess to this recess, from a recess to a peripheral surface of the sealing flange next to this recess, from a recess bottom of a recess to the projection in this recess, and/or from a projection of a recess to a recess bottom of this recess next to this projection.

In addition or as an alternative to two sensors, whose sensing surfaces form various angles to the axis of rotation, the sensor arrangement in an embodiment can have at least one sensor, whose sensing surface converges or diverges in an axial direction. An axial position of the moving vane arrangement can also be detected by the following: given a sensor with a convergent sensing surface, the angle about which the sealing flange must be turned further until a recess or a projection is fully detected by the sensor or not at all detected by the sensor becomes smaller as the sealing flange is displaced further in an axial or convergence direction. Reciprocally, the angle about which the sealing flange must be turned further until a recess or a projection is fully detected by the sensor or not at all detected by the sensor increases the further the sealing flange is displaced in the divergence direction. A width of the corresponding signal swing or a shoulder of a sensor signal decreases or increases correspondingly with the axial position relative to the sensor with a convergent or divergent sensing surface. The width of a signal swing in this case refers in particular to a time or angle of twist across which the signal swing occurs. In an embodiment, this can be detected by the time or the angle between the falling below or exceeding specified limits by a sensor signal, but also by the time or the angle between sensor signals or sensor signal sequences with the same gradient, particularly half of a maximum gradient of the sensor signal or the sensor signal sequence.

Correspondingly, according to an embodiment of the present invention, at least one signal swing is detected after a recess of the recess arrangement is detected by a sensor, whose sensing surface converges or diverges in an axial direction, and a width of this signal swing is assigned to an axial position of the moving vane arrangement on the basis of a calibration.

As explained precedingly, in doing so, the width of a signal swing as a result of a transition from a peripheral surface of the sealing flange next to a recess to this recess, from a recess to a peripheral surface of the sealing flange next to this recess, from a recess bottom of a recess to the projection in this recess, and/or from a projection of a recess to a recess bottom of this recess next to this projection can be detected.

As explained precedingly, a signal swing results both for the signal between the recess bottom and projection or projection and recess bottom, and when entering or exiting a recess into or out of the sensing surface of a sensor. The signal swing is used in an embodiment of the present invention to detect abrasion of the sealing flange: the greater the abrasion, the smaller is the signal swing. Accordingly, in an embodiment, at least one signal swing of the sensor arrangement can be detected as a result of a recess of the recess arrangement and a sealing flange peripheral surface adjoining this recess, particularly positioned before or after in a rotational direction, being detected by a sensor of the sensor arrangement and this signal swing can be assigned to an abrasion of the sealing flange on the basis of a prior calibration.

The seal gap between the sealing flange and the housing, particularly an inlet coating of the housing, can depend on a rubbing on the housing and/or the axial position of the sealing flange, in addition to the radial distance of the sealing flange to a housing-affixed sensor and a possible abrasion of the sealing flange. Accordingly in an embodiment of the present invention, a rubbing of the housing opposite the sealing flange, particularly of a housing inlet coating opposite the sealing flange, is detected, particularly in a periodic manner. When detecting the seal gap, this inlet coating can be taken into account, and in particular be added to a detected radial distance and/or abrasion of the sealing flange.

As explained precedingly, the signal swings or their intervals can be assigned to radial clearances or axial positions by preferably two-dimensional calibration. Accordingly, in an embodiment of the present invention, in particular initially, from the intervals between signal swings, which by means of sensors with counter-directionally inclined sensing surfaces detect one after the other the same recess, and/or from the width of a signal swing that is detected by a sensor with an axially converging or diverging sensing surface, an axial position of a sealing flange is determined and, in particular subsequently, from the signal swings between the recess bottom and projection or adjoining, not recessed, peripheral surface of the sealing flange, the radial distance or abrasion of the sealing flange is determined on the basis of the two-dimensional calibration. In an embodiment, a two-dimensional calibration is used to assign each pair of axial positions and radial distances or seal gaps to an interval between signal swings of sensors, whose sensing surfaces form various angles, or a width of a signal swing of a sensor with axially converging or diverging sensing surfaces, and additionally a signal swing, particularly as a result of detecting a recess and its projection. In this way, when detecting the distance or width and signal swing on the basis of a calibration, the axial position and radial distance or seal gap can be determined. In a development, a current seal gap can be determined from this together with the also detected rubbing.

In an embodiment of the present invention, a peripheral surface of the radial projection is radially depressed in the recess. A rubbing of the sealing flange's remaining peripheral surface surrounding the recess hereby also does not change the signal swing between the recess bottom and projection.

A recess can be arranged entirely in an exterior shroud band section. Similarly, a recess, particularly the projection, can be jointly constructed by means of two adjacent exterior shroud band sections or the recess, particularly the projection, can extend across the contact surface of two adjacent moving vanes. In doing so, the recess, particularly the projection, can be symmetrically distributed on both adjacent exterior shroud band sections or extend symmetrically to the contact surface.

In an embodiment, the sealing flange of one or two adjacent exterior shroud band sections is radially depressed in relation to the sealing flange of the other exterior shroud band sections connecting to it or them, so that the recess extends across one or two entire exterior shroud band section(s). In this way, a recess with a radial projection can be constituted in a particularly simple way. The radial projection can be arranged on the mutually facing contact surfaces of these adjoining exterior shroud band sections.

In an embodiment, the turbomachine stage has a processing means that is configured to execute a method described here. A means according to the present invention may be constructed with hardware and/or software technology, and particularly have a, data- or signal-related, particularly digital, processing, particularly microprocessor unit (CPU), preferably with a storage and/or bus system, and or one or more programs or program modules. The CPU can be designed to execute commands that are implemented as a program stored in a storage system, detect input signals from a data bus and/or deliver output signals to a data bus. A storage system may have one or more, particularly various, storage media, particularly optical, magnetic, solid-body, and/or other non-volatile media. The program can be constituted in such a manner that it can incorporate or execute the methods described here and thereby detect in particular a seal gap and/or an axial position.

Additional advantageous developments of the present invention emerge from the following description. The drawings are partially schematized.

DETAILED DESCRIPTION OF THE DRAWINGS

Figure 1:
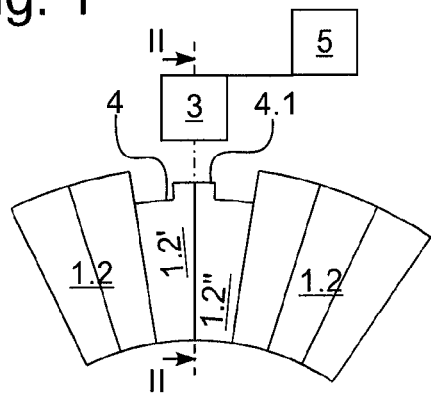
FIG. 1 depicts a part of a turbomachine stage according to an embodiment of the present invention in a view in the axial direction.
Figure 2:
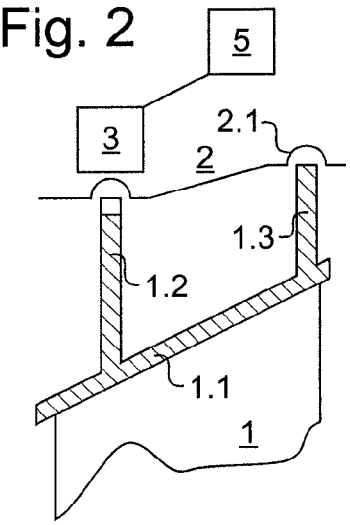
FIG. 2 depicts a part of the turbomachine stage of FIG. 1 along line II-II in FIG. 1.
Figure 4:
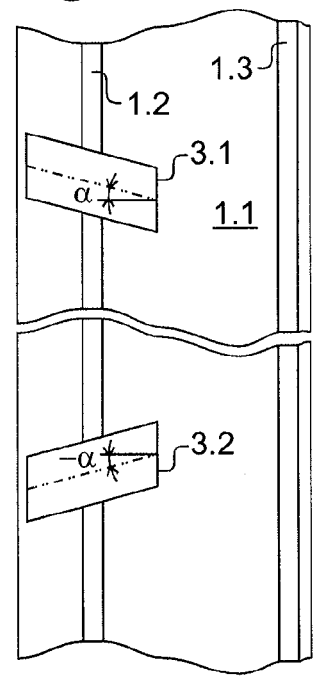
FIG. 4 depicts a top-down view in a radial direction from the outside to a part of a turbomachine stage of FIG. 1.

FIGS. 1, 2, and 4 depict in a view in the axial direction (FIG. 1), a meridional cut (FIG. 2), or an unrolled top-down view in a radial direction of a part of a turbomachine stage according to an embodiment of the present invention. The turbomachine stage can be, for example, a turbine or compressor stage of a gas turbine, preferably of an aircraft engine.

It has a moving vane arrangement with multiple moving vanes 1 adjoining each other in the peripheral direction. The moving vane arrangement is arranged in a conical housing 2.

The moving vane arrangement has a conical exterior shroud band 1.1, which is formed of multiple exterior shroud band sections, to which one or more moving vanes are each connected.

Radially outward on the exterior shroud band, there are arranged in a spaced apart manner two radial sealing flanges 1.2, 1.3 in an axial or flow direction (horizontal from left to right in FIGS. 2 and 4), which extend strut-like radially outward (see FIGS. 1, 2) as well as in the peripheral direction (see FIGS. 1, 4).

The present invention is explained in greater detail below in reference to the left sealing flange 1.2 in FIGS. 2, 4. The embodiments can be applied identically to the right sealing flange 1.3 in FIGS. 2, 4.

Sealing flange 1.2 is formed by multiple sealing flange sections that are integrally constructed with the respective exterior shroud band section and of which in FIG. 1 two are labeled with 1.2' and 1.2" for the sake of better differentiation.

Sealing flange 1.2 has a recess arrangement with four radial recesses 4, of which one is depicted in FIG. 1. Each of the identical recesses has two opposing arms (left, right in FIG. 1) that extend essentially in a radial direction. Between the arms extends a recess bottom that has a cylindrical peripheral surface, so that recess 4 is constructed in a U-shaped manner.

There is arranged in recess 4 a radial projection 4.1, which extends from the recess bottom radially outward and has a cylindrical ring-shaped peripheral surface. Radial projection 4.1 is, when seen in a peripheral direction, centrally arranged in recess 4. Recess 4 with projection 4.1 arranged in it is constructed symmetrically.

There is arranged on housing 2 a sensor arrangement 3 with six capacitive sensors for detecting a radial distance to a peripheral surface of the sealing flange, of which one is depicted in FIGS. 1, 2, and of which two sensors 3.1, 3.2 are depicted in FIG. 4.

When a sensor is passed over by a recess 4, the radial distance changes: first it increases as soon as the sensor detects the recess bottom. Subsequently, the radial distance decreases when the sensor detects the projection. Subsequently, it increases again as soon as the sensor detects the recess bottom on the opposite side of the projection in the peripheral direction. Lastly, the radial distance decreases again to the starting value when it detects the peripheral surface of the sealing flange next to the recess.

Figure 3A:
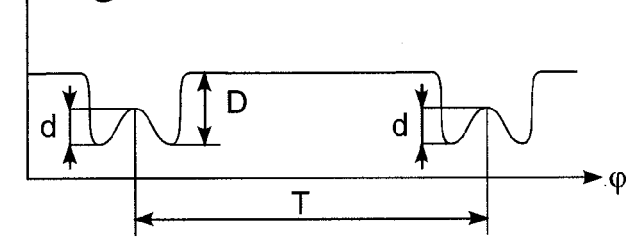
FIG. 3A depicts a signal of a sensor of the turbomachine stage of FIG. 1 for an axial position and a radial distance of a moving vane arrangement of the turbomachine stage.

In this way, when a recess rotates past a sensor, there results a general W-type signal sequence with four alternating, counter-directional signal swings. FIG. 3A depicts such a signal sequence for the two adjacent sensors 3.1, 3.2 when the same recess 4 rotates past sensors 3.1, 3.2 one after the other. In doing so, the horizontal axis φ can equally represent an angle of rotation of the rotor arrangement or the time, since both can be mutually converted into the other via the speed of rotation of the rotor arrangement.

By a processing means 5, the signal swings of the sensor arrangement are detected as a result of the recesses of the recess arrangement and their projections being detected by sensors of the sensor arrangement.

Figure 3B:
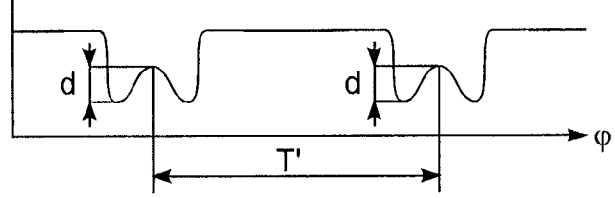
FIG. 3B depicts a signal of the sensor in an illustration corresponding to FIG. 3A for a different axial position.
Figure 3C:
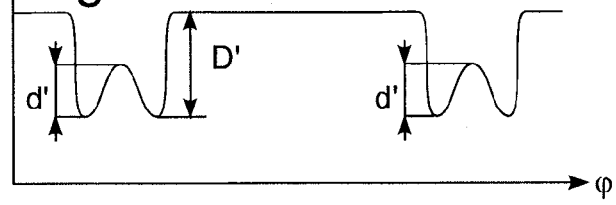
FIG. 3C depicts a signal of the sensor in an illustration corresponding to FIG. 3A for a different radial distance.

Signal swings d, which result due to the clearance change between the recess bottom and the projection and between the projection and the recess bottom, are assigned to a radial distance of the moving vane arrangement on the basis of a prior calibration. FIG. 3C shows the signal sequence of FIG. 3A for another radial distance between moving vane arrangement 1 and sensor arrangement 3 or housing 2. One can see that signal swings d' differ for these various radial distances. Accordingly, signal swing d or d' can be assigned to a certain radial distance on the basis of a prior calibration.

The sensors of the sensor arrangement and their sensing surfaces form counter-directional, equally sized angles ±α of ±15° with an axis of rotation of the turbomachine stage (see FIG. 4).

By these sensing surfaces inclined against the axis of rotation of the turbomachine, an axial position of the moving vane arrangement can be detected. Concerning this, FIG. 3B depicts the signal sequence of FIG. 3A for another axial position of vane arrangement 1: initially signal swings d of the sensor arrangement are detected as a result of a recess of the recess arrangement and the projection in this recess being detected by a sensor 3.1 of the sensor arrangement (left in FIGS. 3A, 3B).

By the rotor continuing to rotate to the other sensor 3.2, subsequently additional signal swings (right in FIGS. 3A, 3B) of the sensor arrangement are detected as a result of this recess and the projection in this recess being detected by the other sensor 3.2 of the sensor arrangement. The time or angle of rotation interval of these signal swings, indicated in FIGS. 3A, 3B by the interval T or T' of the middle peaks, can then be assigned, in processing means 5, to an axial position of the moving vane arrangement on the basis of a prior calibration. In looking at FIG. 4, one can see that for the sensing surfaces, converging from left to right, of sensors 3.1, 3.2, the interval of the signal swings decreases the further the sealing flange is displaced from left to right.

Likewise, as precedingly explained for the signal between recess bottom 4 and projection 4.1 or projection 4.1 and recess bottom 4, a signal swing D or D' (see FIGS. 3A, 3C) also results when entering or exiting a recess into or out of the sensing surface of a sensor. The signal swing is used in processing means 5 to detect an abrasion of sealing flange 1.2: the greater the abrasion, the smaller signal swing D or D' is. Correspondingly, signal swings of the sensor arrangement are detected as a result of a recess of the recess arrangement and a sealing flange peripheral surface adjoining this recess, particularly positioned ahead or after in the direction of rotation, being detected by a sensor of the sensor arrangement and these signal swings are assigned to an abrasion of the sealing flange on the basis of a prior calibration.

The seal gap between the sealing flange and housing, particularly an inlet coating of the housing, can depend on the radial distance of the sealing flange to a housing-affixed sensor and any abrasion of the sealing flange as well as a rubbing 2.1 on the housing, as indicated in FIG. 2. Correspondingly, a rubbing of housing 2 opposite the sealing flange, particularly of the housing 2 inlet coating opposite the sealing flange, is periodically detected and taken into consideration, in particular added to a radial distance and an abrasion of the sealing flange, by processing means 5 when detecting the seal gap.

In FIG. 1, one can see that the peripheral surface of radial projection 4.1 is radially depressed in recess 4 and that recess 4 and projection 4.1 extend across the contact surface of two adjoining moving vanes. Concerning this, sealing flanges 1.2', 1.2" of two adjoining exterior shroud band sections are radially depressed in relation to sealing flange 1.2 of the exterior shroud band sections connecting to them (see FIG. 1), so that recess 4 extends across both entire exterior shroud band sections 1.2', 1.2". Radial projection 4.1 is arranged on the mutually facing contact surfaces of this adjoining exterior shroud band section 1.2', 1.2".

Figure 5:
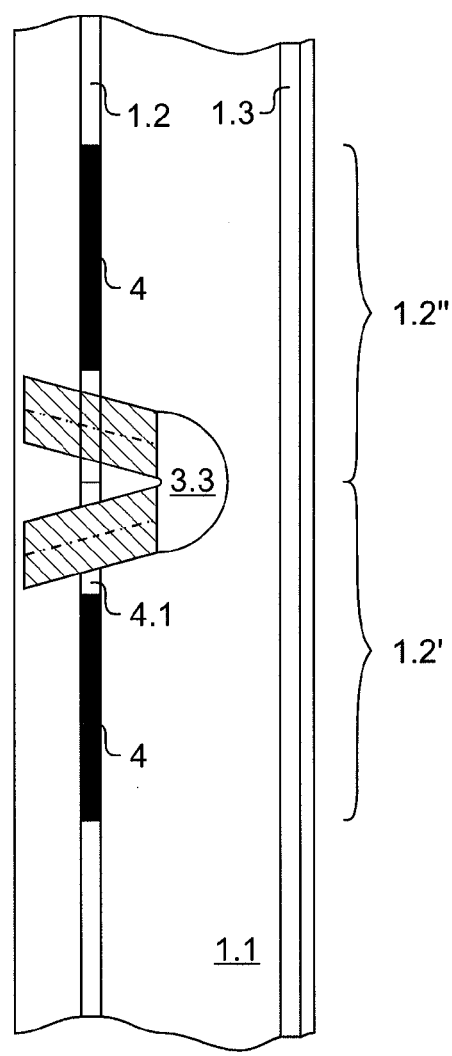
FIG. 5 depicts a part of a turbomachine stage according to another embodiment of the present invention in an illustration corresponding to FIG. 4.

FIG. 5 depicts in an illustration corresponding to FIG. 4 a top-down view in a radial direction from the outside to a part of a turbomachine stage according to another embodiment of the present invention. Congruent elements are identified by identical reference signs so that reference is made to the remaining description and subsequently only the differences to the embodiment according to FIGS. 1-4 are addressed.

The sensor arrangement of the embodiment according to FIG. 5 has a sensor 3.3 for detecting a radial clearance to a peripheral surface of the sealing flange, whose hatched sensing surface in FIG. 5 converges in an axial direction (from left to right). As one can see in FIG. 5, the sensing surface is thereby designed in a bi-radial manner, which can be represented for example by a V-shaped capacitive sensor.

When this sensor is passed over by a recess 4, whose recess bottom in FIG. 5 is shown in a dark color, the radial distance changes: first it increases, as soon as the sensor detects the recess bottom. Subsequently, the radial distance decreases when the sensor detects the projection 4.1. Subsequently, it increases again as soon as the sensor detects the recess bottom on the opposite side of the projection in the peripheral direction. Lastly, the radial distance decreases again to the starting value, when the sensor detects the peripheral surface of the sealing flange next to the recess.

Figure 6:
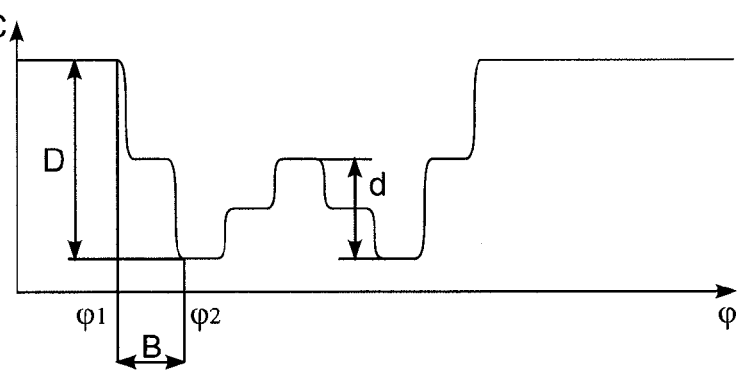
FIG. 6 depicts a signal of a sensor of the turbomachine stage of FIG. 4 in an illustration corresponding to FIG. 3A.

In this way, when a recess rotates past a sensor, a generally W-type signal sequence results with four alternating, counter-directional signal swings. FIG. 6 depicts such a signal sequence in an illustration corresponding to FIG. 3A.

Due to the bi-radial sensing surface, the signal swings thereby each have plateaus: if the recess is rotated into the one sensing surface, the signal decreases in a tapering manner. Then, when the recess is rotated also into the other sensing surface, the signal decreases further in a tapering manner. Correspondingly, the signal increases step-wise in a tapering manner as soon as the projection is rotated into the sensing surfaces or the projection is rotated out of the sensing surfaces.

Due to the converging sensing surface, width B of the signal swings or edges changes: the sensing surface is wider at left in FIG. 5 in the peripheral direction (vertical in FIG. 5) than on the right. Correspondingly, a greater twisting of sealing flange 1.2 is required until its recess or projection is detected to a maximum degree or not at all by sensor 3.3. In this way, a width B of signal swing D increases as a result of sensor 3.3 detecting recess 4 when transitioning between the peripheral surface of sealing flange 1.2 next to recess 4 (bottom in FIG. 5) and the recess. This width B can be assigned to an axial position of sealing flange 1.2 relative to sensor 3.3 on the basis of a two-dimensional calibration.

Width B can, for example, be determined between a point $\varphi 1$, at which the sensor signal C exceeds a preset value for the first time, and a another point $\varphi 2$, at which sensor signal C falls below a preset smaller value for the first time. Similarly, width B can be determined between two points $\varphi 1$, $\varphi 2$ at which sensor signal C has the same gradient $dC/d\varphi$, for example half of a maximum gradient. In this way, width B can be determined independently from an absolute magnitude of sensor signal C. Instead of signal swing D, signal swing d can be used as a result of detecting recess 4 and its projection 4.1.

Even though in the preceding description, sample embodiments were explained, it is pointed out that a plurality of variations are possible. In addition, it is pointed out that the sample embodiments only pertain to examples that are in no way intended to restrict the protective scope, applications, and the structure. Rather, a person skilled in the art is given by means of the preceding description a guideline for implementing at least one of the sample embodiments, wherein diverse changes, particularly in regard to the function and arrangement of the described components, may be undertaken without departing from the protective scope, as emerges from the claims and these equivalent combinations of features.

LIST OF REFERENCE CHARACTERS

1 Moving vane (arrangement)
1.1 Exterior shroud band (section)
1.2, 1.3 Sealing flange
1.2', 1.2" Sealing flange section
2 Housing
2.1 Rubbing
3 Sensor arrangement
3.1, 3.2, 3.3 (Sensing surface of a) sensor
4 Recess
4.1 Radial projection
5 Processing means As also discussed above, the foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A turbomachine stage, comprising:
a housing having an external surface;
a moving vane arrangement disposed within the housing, wherein the moving vane arrangement disposed along an axial rotation axis and including at least one radially disposed vane disposed along a radial axis transverse to the axial rotation axis, the at least one vane having an exterior shroud band section including a sealing flange, the sealing flange having a recess arrangement including a radial recess and a radial projection, that together, define a peripheral surface of the sealing flange; and
a sensor arrangement including a sensor having a sensing surface, the sensor arrangement being arranged on the housing so that the sensing surface of the sensor positionally converges towards or positionally diverges away in a direction relative to the radial axis in a direction that is different from the direction of the radial axis, and the converging or the diverging sensing surface of the sensor and the peripheral surface of the sealing flange, in combination, further define a radial clearance therebetween, and a radial distance of the radial clearance is detectable by the positionally converged or the positionally diverged sensor.

2. The turbomachine stage according to claim 1, wherein the turbomachine stage is a turbine stage or compressor stage of a gas turbine.

3. The turbomachine stage according to claim 1, wherein the sensor arrangement has a second sensor and a third sensor, wherein sensing surfaces of the second sensor and the third sensor form counter-directional, essentially equally sized angles with an axis of rotation of the turbomachine stage.

4. The turbomachine stage according to claim 1, wherein the peripheral surface of the sealing flange associated with the radial projection is radially spaced radially outbound from the peripheral surface of the sealing flange disposed adjacent to the radial recess.

5. The turbomachine stage according to claim 1, further comprising a processor coupled to the sensor arrangement.

6. A method for determining one or both of a radial distance and an axial position of a seal gap between a sealing flange of a moving vane arrangement and a housing in a turbomachine stage, the moving vane arrangement disposed along an axial rotation axis and having at least one vane disposed along a radial axis that is transverse to the axial rotation axis, wherein the sealing flange has a recess arrangement with a radial recess and a radial projection and wherein a sensor arrangement with a sensor has a sensing surface and is arranged on the housing so that the sensing surface of the sensor positionally converges towards or positionally diverges away in a direction relative to the radial axis that is different from the direction of the radial axis, comprising the steps of:
   detecting the radial recess and the radial projection of the recess arrangement by the positionally converged or the positionally diverged sensor;
   generating a signal swing representative of the detected radial recess and the radial projection by the positionally converged or the positionally diverged sensor; and
   determining the radial distance of the seal gap at least in part from the generated signal swing.

7. The method according to claim 6, further comprising the step of assigning the signal swing to the radial distance of the moving vane arrangement based on a prior calibration.

8. The method according to claim 7, further comprising the steps of:
   detecting a second signal swing of the sensor arrangement as a result of the radial recess and the radial projection being detected by the sensor of the sensor arrangement; and
   assigning the signal swing and the second signal swing to an axial position of the moving vane arrangement based on a prior calibration.

9. The method according to claim 7, further comprising the steps of:
   detecting a second signal swing of the sensor arrangement as a result of the radial recess or the radial projection being detected by the positionally converged or the positionally diverged sensor of the sensor arrangement; and
   assigning a width of the second signal swing to an axial position of the moving vane arrangement based on a prior calibration.

10. The method according to claim 7, further comprising the step of detecting a rubbing on the housing opposite from the sealing flange.

* * * * *